United States Patent [19]

Hiyama et al.

[11] Patent Number: 4,480,402
[45] Date of Patent: Nov. 6, 1984

[54] METHOD AND APPARATUS FOR PLANT CULTURE

[75] Inventors: Kazuo Hiyama; Howard K. Hiyama, both of Fowler; Dean H. Hiyama, Fresno, all of Calif.

[73] Assignee: Hiyama Farms, Inc., Fowler, Calif.

[21] Appl. No.: 300,614

[22] Filed: Sep. 9, 1981

[51] Int. Cl.³ ............................................. A01B 39/28
[52] U.S. Cl. ...................................... 47/1 R; 56/330
[58] Field of Search ................................ 47/44-46, 47/ 4, 1; 56/330, 331, 328

[56] References Cited

U.S. PATENT DOCUMENTS

| | | | |
|---|---|---|---|
| 2,865,135 | 12/1958 | Gamboni et al. | 47/1 |
| 2,893,194 | 7/1959 | Lamouria | 56/331 |
| 2,929,184 | 3/1960 | Lamouria | 56/1 |
| 3,277,605 | 10/1966 | O'Brien | 47/1 |
| 3,328,944 | 7/1967 | Shepardson | 56/331 |
| 3,360,913 | 1/1968 | Burton | 56/34 |
| 3,490,217 | 1/1970 | Olmo et al. | 56/330 |
| 3,492,801 | 2/1970 | Olmo et al. | 56/330 |
| 3,526,055 | 9/1970 | Cortopassi | 47/1 |
| 3,546,856 | 12/1970 | Hiyama | 56/1 |
| 3,585,754 | 6/1971 | Cortopassi et al. | 47/1 |
| 3,585,756 | 6/1971 | Johnson | 47/46 X |
| 3,587,217 | 6/1971 | Harriott | 47/1 X |
| 3,601,964 | 8/1971 | Fisher et al. | 56/330 |
| 3,636,688 | 1/1972 | Fontan et al. | 56/330 |
| 3,827,503 | 8/1974 | Hansen | 171/38 |
| 3,890,774 | 6/1975 | Bruel | 56/330 |
| 4,172,352 | 10/1979 | McCarthy et al. | 56/328 |
| 4,214,427 | 7/1980 | Bobard et al. | 56/330 |
| 4,255,922 | 8/1981 | Hiyama et al. | 56/330 |
| 4,291,526 | 9/1981 | Hiyama et al. | 56/330 |

FOREIGN PATENT DOCUMENTS

| | | |
|---|---|---|
| 2298928 | 1/1976 | France . |
| 2302025 | 9/1976 | France ............................... 47/4 |

Primary Examiner—Robert E. Bagwill
Attorney, Agent, or Firm—Huebner & Worrel

[57] ABSTRACT

The method including the steps of growing plants supported on a structure with pendant portions of the plants extending downwardly therefrom and moving the pendant portions of the plants upwardly over the plants prior to harvest. The apparatus having a conveyor with a grasping section operable to introduce the pendant portions to the conveyor for transport therealong and a releasing section operable to release the pendant portions from the conveyor and a mount borne by the conveyor for securing the conveyor on a vehicle for transport along the plants with the grasping section deployed for contact with the pendant portions and the releasing section disposed above the plants for releasing the pendant portions on to the plants.

13 Claims, 6 Drawing Figures

Fig. 1

U.S. Patent  Nov. 6, 1984  Sheet 2 of 2  4,480,402
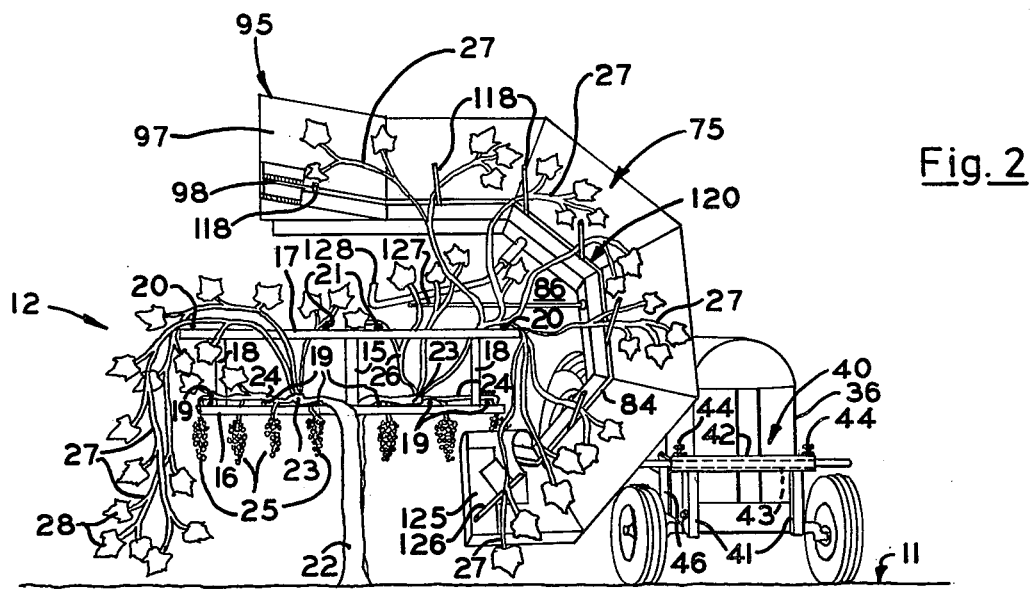
Fig. 2
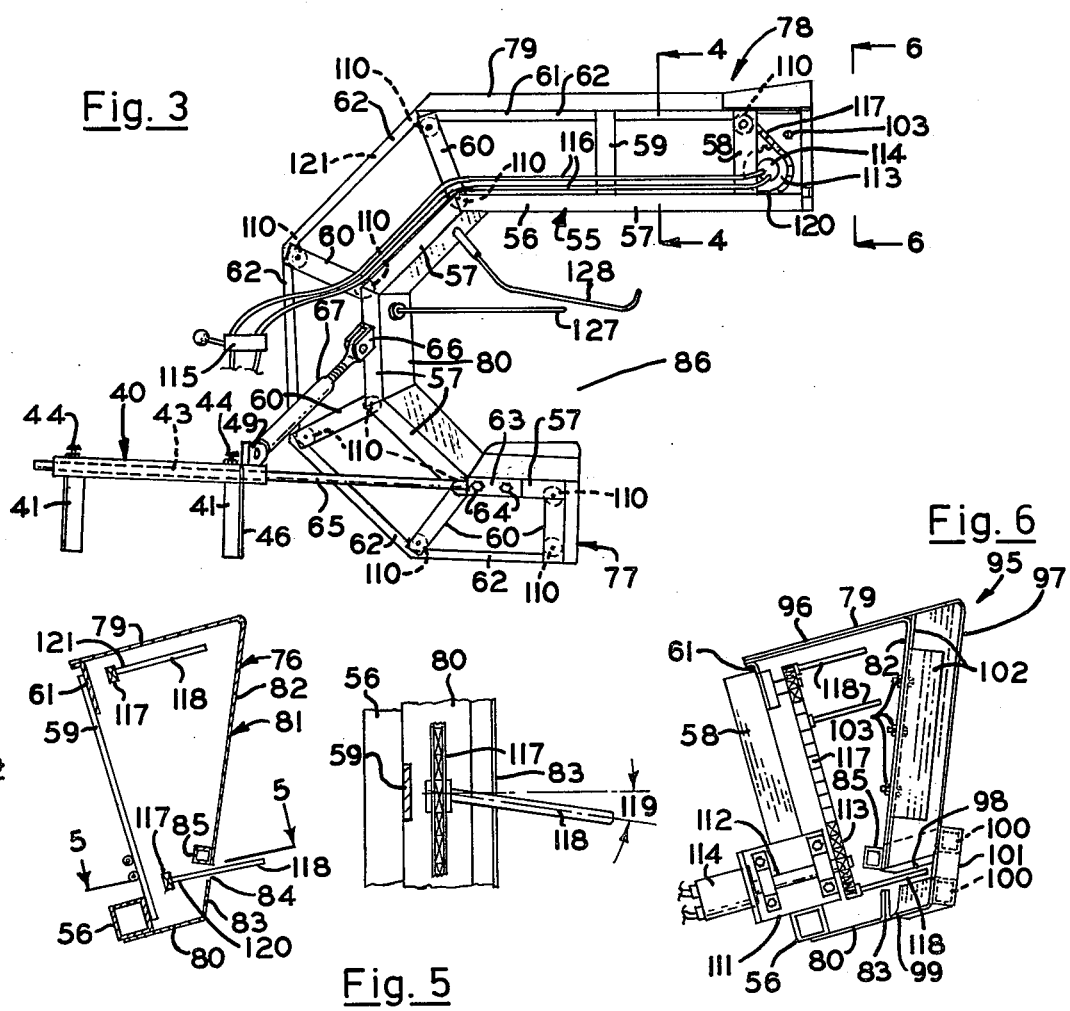
Fig. 3
Fig. 4
Fig. 5
Fig. 6

METHOD AND APPARATUS FOR PLANT CULTURE

BACKGROUND OF THE INVENTION

1. Field of the Invention:

The present invention relates to a method and apparatus for plant culture and more particularly to such a method and apparatus having great utility in the farming of vine borne crops in such a manner as to facilitate the various operations which must be performed incident thereto while enhancing the character of the crops produced.

2. Description of the Prior Art:

Plant culture, and particularly the farming of vine borne crops, has seen the development of a wide assortment of methods and apparatus for training the plants to grow in a manner most suited to the specific objective at hand. For example, there are particular problems incident to the growing of vine borne crops such as grapes resulting from the manner in which such vines grow. Typically, the vines are grown in rows supported on trellises wherein the crop is supported above the ground and enshrouded by pendant portions of the vines extending downwardly about the crop toward the earth's surface. Such pendant portions, including the canes and foliage thereof, serve a purpose during a portion of the growing cycle in protecting the fruit during its formative stages from heat, insects, dust and the like which might adversely affect the growth of the fruit. Conversely, these pendant portions of the vines are often a great impediment to the performance of other operations required during the growing season such as fumigating, dusting and the like and in harvesting the crop once grown.

Because of these difficulties, a variety of types of practices have been adopted in an effort to overcome the problems involved. Various systems have been employed for trellising the vines in such a manner as to enhance the growth of the crop and to ease the burdens encountered in caring for the crops. The Applicants, for a number of years, have trained grapevines on a trellis wherein the crop is grown in a substantially common zone extending longitudinally of the trellis structure and the pendant portions of the vines are extended upwardly over trellis wires and allowed to trail toward the earth surface outwardly from the zone in which the crop is substantially contained. For example, such systems are shown in the Hiyama U.S. Pat. No. 3,546,856 and the Hiyama et al. U.S. Pat. No. 4,255,922. The prior art is replete with other forms of trellising which seek to achieve in various ways other advantages in plant culture.

Still further, it is known to use what are commonly referred to in the trade as "cane lifters" in conjunction with mechanical grape harvesters to raise pendant portions of vines to a sufficient elevation to expose the fruit for harvesting and then to release the pendant portions so that they fall to their normal attitudes after passage of the harvester therealong.

Notwithstanding the foregoing prior art efforts in plant culture, there has heretofore been no method and apparatus for plant culture capable of controlling and utilizing the pendant portions of plants for beneficial horticultural purposes.

Therefore, it has long been known that it would be desirable to have a method and apparatus for plant culture which overcomes the multiplicity of problems incident to the growing of crops where pendant portions of the plants encapsulate the crop or otherwise interfere with the work operations involved in the growing of such crops and to have a method and apparatus which enhance the quality of the crop produced.

SUMMARY OF THE INVENTION

Therefore, it is an object of the present invention to provide an improved method and apparatus for plant culture.

Another object is to provide such a method which has particular utility in the growing of vine borne crops such as grapes.

Another object is to provide such a method which permits the farmer to dispose the pendant portions of plants in attitudes most suited to the specific work operation to be performed while achieving such benefits as can be attained from the pendant portions of the plants throughout the growing season.

Another object is to provide such a method which is operable to enhance the quality of the crop grown by allowing the farmer to control during the growing season such ambient conditions as heat, sunlight, moisture, ventillation, and the accessibility of the crop to such operations as fumigating, dusting and harvesting in a manner not heretofore possible.

Another object is to provide such a method which is adaptable for use on vines grown on a variety of different types of trellis structures.

Another object is to provide an apparatus which is particularly well suited to practice of the method of the present invention and is operable to permit the farmer selectively to position the pendant portions of plants such as grapevines in attitudes most suited to a particular work operation to be performed and which can be mounted for such use on present modes of conveyance such as tractors without substantial modification thereof.

Another object is to provide such an apparatus which can readily be adjusted to suit a particular condition of the plants upon which it is to be used.

Another object is to provide such an apparatus which is fully automated so as to require little or no attention by the operator other than in steering the vehicle on which the apparatus is supported along the row.

Further objects and advantages are to provide improved elements and arrangements thereof in an apparatus for the purposes described which is dependable, economical, durable and fully effective in accomplishing its intended purposes.

BRIEF DESCRIPTION OF THE DRAWINGS

FIG. 1 is a fragmentary side elevation of the apparatus of the present invention shown mounted on and with respect to a tractor, shown in phantom lines, and in operation in the practice of the method of the present invention on a row of grapevines.

FIG. 2 is a perspective view of the apparatus viewed in FIG. 1 mounted on a tractor and being operated, in the practice of the method of the present invention, on a row of grapevines.

FIG. 3 is a rear elevation of the apparatus of the present invention.

FIG. 4 is a somewhat enlarged section taken on line 4—4 in FIG. 3.

FIG. 5 is a somewhat further enlarged section taken from a position indicated by line 5—5 in FIG. 4.

FIG. 6 is an end view taken on line 6—6 in FIG. 3.

DESCRIPTION OF THE PREFERRED EMBODIMENT

Figure 1:
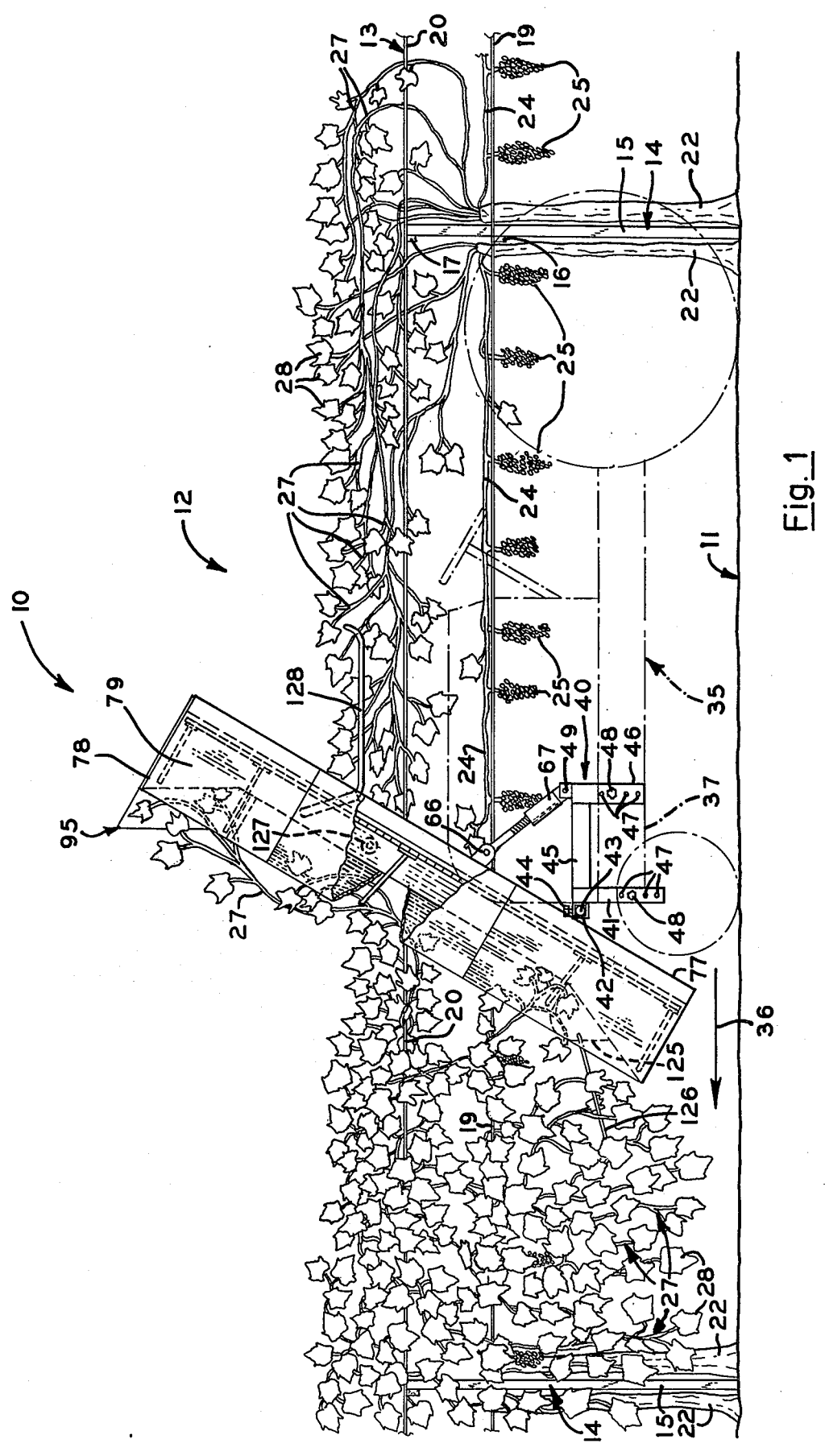

Referring more particularly to the drawings, the apparatus of the present invention is generally indicated by the numeral 10 in FIG. 1. The earth surface is represented at 11 and a row of grapevines at 12.

In accordance with the method hereof, it will be understood that the row of grapevines 12 is oriented along a north-south axis so that one side of the row faces east and the other side of the row faces west. Of course, all of the rows in the vineyard are individually oriented along spaced substantially parallel north-south axes. While such orientation of the rows is not critical to the method and apparatus of the present invention, it does offer unique benefits which will subsequently be described in greater detail.

The row of grapevines 12 is supported on a suitable structure or trellis 13 to support the vines in upright relation. The specific trellis structure employed can be any one of a variety of types and the method of the present invention is not limited to a particular form of trellis. In fact, the method and apparatus hereof are operable with respect to grapevines trellised in virtually any manner. Nonetheless, the specific manner of trellising shown and described herein have been found particularly useful in the practice of the method and operation of the apparatus hereof.

The trellis 13 consists of a plurality of upright supports 14 mounted in the earth and extending upwardly from the earth surface 11 coincident with and aligned with the row of grapevines 12. Each support has an upright member 15 mounted in the earth having a lower crossarm 16 and an upper crossarm 17 disposed in horizontal relation substantially parallel to each other. The crossarms are spaced from each other a distance such as can best be visualized in FIG. 2 and are interconnected adjacent to their corresponding opposite ends by vertical braces 18. The lower crossarm 16 of the supports are interconnected longitudinally of the row by six lower trellis wires 19 extending in spaced relation to each other longitudinally of the row. The upper crossarms of the supports are interconnected longitudinally of the row by outer upper trellis wires 20 adjacent to corresponding outermost portions of the upper crossarms and inner upper trellis wires 21 adjacent to the upright members of the supports also as best shown in FIG. 2.

The row of grapevines 12 has a plurality of grapevines 22 rooted in the earth and extending upwardly therefrom. A pair of grapevines are individually grown on opposite sides of each support 14 and are trained upwardly to the lower crossarm 16 and then outwardly to support head portions 23 thereof outwardly from the support along the lower crossarm. The head portions of the pair of grapevines of each support extend in opposite directions from the support along the lower crossarm, as best shown in FIG. 2. Fruiting canes 24 grow from the head portion of each grapevine and are trained along the lower trellis wires 19 longitudinally of the row. As shown in FIG. 1, the fruiting canes are trained to grow from their respective grapevines away from the support along the lower trellis wires. The grapes 25 when grown thus are supported in a zone about the lower trellis wires 19. The other, nonfruiting canes 26 are trained upwardly from the head portion 23 of each grapevine in the direction of the upper crossarm 17 and between the outer and inner upper trellis wires 20 and 21 respectively on its side of the support, as best shown in FIG. 2. The outer and inner upper trellis wires support the nonfruiting canes during growth. The nonfruiting canes supported on each outer trellis wire trail downwardly forming trailing or pendant portions 27 which extend toward or to the earth surface 11. The canes 24 and 26, of course, grow foliage such as indicated at 28.

As can best be visualized in FIGS. 1 and 2, the trailing or pendant portions 27 of the vines and the foliage 28 offer protection for the vines and the grapes by serving as a natural barrier to insects, dust, precipitation and heat during the growing season.

The apparatus 10 is adapted to be mounted on a vehicle, in this case a tractor 35 for movement in a normal direction of travel indicated by arrow 36 along the row of grapevines 12. The tractor has a front portion 37. It will be understood that any suitable vehicle can be employed for the purpose and that, in fact, the apparatus can be so constructed as to be self-propelled or constructed as shown herein in a manner adapted for mounting on any suitable vehicle for earth traversing movement.

The apparatus 10 has a mounting assembly 40 including a pair of spaced, substantially parallel angle iron members 41. The angle iron members 41 are interconnected at corresponding upper ends by a channel iron cross member 42 extending therebetween in substantially right angular relation to the angle iron members 41. A sleeve 43 is mounted within the channel iron member and has lock bolts 44 individually screw-threadably received in the sleeve individually adjacent to its opposite ends and adjustable for movement inwardly and outwardly from the interior of the sleeve. A side plate 45 is secured by welding on the angle iron member 41 on the left as viewed in FIG. 2 and extends rearwardly therefrom, as best shown in FIG. 1. A rear plate 46 is mounted by welding on the remote end of the side plate extending downwardly therefrom substantially parallel to the angle iron members 41. The rear plate and angle iron members have a plurality of holes 47 extended therethrough in positions vertically aligned for use in mounting the mounting assembly on the front portion 37 of the tractor 35. Bolts 48 are employed for this purpose and, depending upon the structure afforded by the front portion of the tractor, can be screw-threadably secured in internally screw threaded holes in the front portion of the tractor or can be secured on a mounting frame using nuts. In any case, it can be seen in FIG. 1 that the mounting frame is adjustable upwardly and downwardly relative to the earth surface by selection of the desired holes in the angle iron members and rear plate through which the bolts 48 are extended. A pivot mount 49 is mounted on the upper end of the rear plate 46, as shown in FIG. 1.

The apparatus 10 has a frame 55 which has a main tubular beam 56 composed of sections 57 weldably secured to each other so as to form the return bent configuration best shown in FIG. 3. As shown therein, a tubular brace 58 is mounted by welding on the tubular beam in substantially right angular relation thereto. A plate brace 59 is mounted by welding in spaced relation to the tubular brace in spaced, substantially parallel thereto. A plurality of channel iron braces 60 are secured by welding on the tubular beam at the points of juncture of adjoining sections 57 of the tubular beam 56 and extend outwardly therefrom. An angle iron member 61, as mounted on the remote ends of the tubular brace 58, plate brace 59 and channel iron braces 60. The angle iron member is composed of a plurality of sections 62 which are weldably secured on the remote portions of the braces, as best shown in FIG. 3. A sleeve 63 is secured by welding on the main tubular beam 56 adjacent to the lower portion thereof and has a pair of lock bolts 64 screw-threadably secured therein for adjustment into and out of the interior of the sleeve. A support bar 65 is slidably received in the sleeve 43 of the mounting assembly 40 and the sleeve 63. The respective lock bolts 44 and 64 of the sleeves are employed to secure the bar in the desired position, as shown in FIG. 3 relative to the sleeves. A pivot mount 66 is secured by welding on the tubular beam 56 in the position shown in FIG. 3. A turnbuckle assembly 67, which can be adjusted to various lengths, is mounted on and operably interconnects the pivot mount 49 of the mounting assembly and the pivot mount 66. By loosening the lock bolts 44 and/or the lock bolts 64, the frame can be moved farther from or nearer to the vehicle. Using the turnbuckle assembly 67, the angle of the frame 55 can be adjusted to the attitude desired. Lengthening or contracting of the turnbuckle assembly causes the frame 55 to be pivoted about the support bar 65. The preferred attitude for the frame is that shown in FIG. 1. Once the desired position and attitude for the apparatus has been selected, the lock bolts 44 and 64 can again be tightened into engagement with the bar to lock the frame in the selected position.

A conveyor 75 is mounted on the frame and includes a housing 76 which is weldably secured on the frame. The conveyor and housing have a first portion or grasping section 77 adjacent the earth surface 11, as shown in FIG. 1. The conveyor has a second portion or releasing section 78 at the opposite end of the conveyor from the grasping section. The housing is formed from a plurality of metal plates welded together to form an outer wall 79 extending about the periphery of the frame 55 and an inner wall 80 extending about the interior of the frame, as best shown in FIG. 3. A guide wall 81 is weldably secured on the outer and inner walls of the housing and disposed at an angle which can best be visualized in FIG. 4. The guide wall is composed of a plurality of major plates 82 weldably secured on the outer wall and to each other about the face of the frame and a plurality of minor plates 83 weldably secured on the inner wall 80 and extending toward the major plates in the same plane thereof, as best shown in FIG. 4. The major and minor plates are spaced from each other to form a slot 84 in the housing extending from the grasping section 77 to the releasing section 78 as can best be seen in FIG. 2. A tubular brace 85 is welded on the major plates within the housing immediately adjacent to the slot 84 so as to reinforce the housing. The inner wall 80 of the housing bounds a passage 86 through which a portion of the row of grapevines 12 is intended to pass in relative movement during operation of the apparatus and practice of the method hereof.

The releasing section 78 of the conveyor 75 mounts an adjustment housing 95. The adjustment housing has an upper plate 96 which is received in outer facing engagement with the outer wall 79 of the housing 76. The adjustment housing has a face plate 97 weldably secured on the upper plate and disposed in an angle in one plane corresponding to that of the angle of juncture of the outer wall 79 and guide wall 81, but deviated outwardly further than the housing 76 in roughly the direction toward the right as viewed in FIG. 6. The face plate has a slot 98 therein communicating with the slot 84 of the housing. The adjustment housing has a lower plate 99. A pair of tubular braces 100 bound the slot 98 on the exterior side thereof. The remote ends of the tubular braces are interconnected by a right-angularly related brace plate 101. A slot plate 102 is affixed by welding on the interior side of the face plate 97 of the adjustment housing. The slot plate is bent so that one portion of the slot plate can facingly engage the major plate 82 of the guide wall 81 when the adjustment housing is disposed in the angle shown in FIG. 6. The slot plate has three slots extending therethrough substantially parallel to the adjacent outer wall 79 of the housing 76. Three nut and bolt assemblies 103 extend through holes provided for the purpose in the major plate 82 of the guide wall 81 and individually through the slots in the slot plate. Thus, by loosening the nut and bolt assemblies, the entire adjustment housing 95 can be adjusted to the right or to the left as viewed in FIG. 2 and then again tightened into position by tightening the nut and bolt assemblies 103.

The conveyor 75 has a plurality of idler sprocket assemblies 110 individually mounted in the positions shown in FIG. 3 at the opposite ends of the channel iron braces 60 and on the upper end of the tubular brace 58. An hydraulic motor mount 111 is secured on the tubular brace 58 in the position shown best in FIGS. 3 and 6. A drive shaft 112 is rotationally received in the motor mount and mounts a drive sprocket 113 on the end thereof within the housing 76. An hydraulic motor 114 is borne by the motor mount at the opposite end of the drive shaft from the drive sprocket 113 in driving relation thereto and to the sprocket 113. An hydraulic control valve 115, preferably connected to the hydraulic system of the tractor 35, as connected in driving relation to the hydraulic motor 114 by a pair of hydraulic conduits 116. A drive chain 117 is entrained about the idler sprocket assemblies 110 and the drive sprocket 113, as best shown in FIG. 3. Thus, operation of the hydraulic motor using the control valve 115 causes the chain to follow a path about the idler sprockets and the drive sprocket within the housing in a clockwise direction as viewed in FIG. 3. A plurality of members or fingers 118 are mounted on the drive chain 117 in spaced relation along substantially the entire length thereof. As can best be visualized in FIG. 4, the fingers are of a length such as to extend outwardly through the slot 84 of the guide wall 81 of the housing. The fingers are individually mounted on a chain at an angle 119 with respect to the chain and in the plane of movement of the chain, as can be seen in FIG. 5. The angle is forwardly of a true right angular relation to the chain in the direction of its movement. This angle or deviation from a true right angular relation to the chain is preferably not greater than about 10° from the true right angular relation or, in other words not greater than 100° relative to the chain.

The drive chain 117 can be viewed as having a transporting run 120 which moves in counterclockwise direction as viewed in FIG. 2 along the slot 84 and a clockwise direction as viewed in FIG. 3. The length of the fingers is such that when moving in a return run 121 which moves in a clockwise direction as viewed in FIG. 2 and a counterclockwise direction as viewed in FIG. 3, the fingers are fully contained within the housing 76.

A pick up housing 125 is weldably secured on the grasping section 77 of the conveyor and is shaped to help introduce the pendant portions 27 of the canes 26 to the grasping section of the conveyor. The pick up housing mounts a rod 126 which extends forwardly, inwardly and downwardly with respect to the direction of travel 36 and the row of grapevines 12, as can best be visualized in FIGS. 1 and 2. The rod assists in gathering the pendant portions 27 and introduce them to the grasping section 77 of the conveyor.

A first flexible rod 127 is mounted on the inner wall 80 of the housing 76 extending across the passage 86. A second flexible rod 128 is mounted above the first flexible rod and extends obliquely and rearwardly therefrom with respect to the direction of travel of the tractor 35. The flexible rods are preferably constructed of semiflexible plastic material such as employed as beater rods on grape harvesters.

OPERATION

The practice of the method and the operaton of the apparatus of the present invention are believed to be clearly apparent and are briefly summarized at this point.

As previously described, the rows of grapevines 12, in the practice of the method hereof, are preferably grown in spaced substantially parallel rows which are individually oriented along north-south axes so that one side of each row faces east and the opposite side of each row faces west. Such orientation permits each side of each row to receive approximately the same amount of sunlight during each day depending, of course, upon weather conditions. The grapevines 22 are preferably, although not necessarily, trellised in the manner already described and shown in FIGS. 1 and 2.

The apparatus 10 is mounted on the front portion 37 of the tractor 35 in the manner already described so that the frame 55 is disposed in the attitude shown in FIG. 1 relative to the direction of travel indicated by arrow 36 and extends laterally of the front portion of the tractor, as shown in FIG. 2. Rows of grapevines 12, whether trained on the trellis 13 as heretofore described or trained in another manner, have trailing or pendant portions 27 extending downwardly in first attitudes toward and frequently reaching the earth surface 11. As previously noted, during a portion of the growing season, it is advantageous to allow the pendant portions 27 to remain in these positions so as to protect the vines and crop from damage. However, during other portions of the growing season, it has been found advantageous in the practice of the method of the present invention to reposition the pendant portions in positions extending over the grapevines, as illustrated in FIGS. 1 and 2. This is quite beneficial for spraying, fumigating and dusting the grapevines, vine drying the grapes to form raisins, exposing the crop to direct sunlight, ventilating the crop, protecting the crop from precipitation, harvesting the crop and a number of other work operations incident to plant culture and particularly the farming of vine borne crops. For example, in the case of the vine drying of grapes to form raisins, such positioning of the pendant portions exposes the crop for the spraying of the solution which initiates the vine drying process, exposes the grapes to direct sulight for enhanced drying and exposes the fruiting canes so that they are clearly visible for severing which is a part of the vine drying process.

In accordance with the method hereof, the tractor 35 is driven along the row of grapevines 12 so that the side of the row of grapevines passes through the passage 86 of the frame 55, as shown in FIGS. 1 and 2. The hydraulic control valve 115 is operated to drive the hydraulic motor 114 and thus move the drive chain 117 in the transporting and return runs 120 and 121 heretofore described. The tractor is then driven along the row of grapevines as shown in FIG. 2. During such movement, the fingers 118 of the drive chain extend through the slot 84 and move in a counterclockwise direction along the slot as shown in FIG. 2 from the grasping section 77 to the releasing section 78.

Movement of the pick up housing 125 against the pendant portions 27 of the grapevines 22 causes the pendant portions to slide along the rod 126 and pick up housing 125 and to be snared by one or more fingers 118 moving along the slot 84. Continued movement of each finger along the transporting run 120 of the conveyor 75 causes the pendant portions so supported thereon similarly to be moved along the path and thus to be elevated through the positions shown in FIG. 2 until at the time the pendant portions reaches the releasing section 78 of the conveyor, the pendant portion is in a position extended over other portions of the grapevine. As its respective finger moves into the slot 98 of the adjustment housing 95, the deviated angle of the face plate 97 of the adjustment housing causes the finger to, in effect, be retracted within the adjustment housing thereby releasing the pendant portion of the cane supported thereon and depositing it in a second attitude extending over other portions of the grapevine and the trellis 13.

Continued movement of the apparatus 10 along the row of grapevines 12 causes the first and second flexible rods 127 and 128 respectively to travel over the pendant portions 27 now rested on the grapevines to exert downward pressure on the pendant portions against the other foliage 28 of the grapevines so as to insure that the pendant portions do not flop back to their original positions. As can best be visualized in FIG. 1, even though the housing 76 is sloped backwardly with respect to the direction of travel as shown in FIG. 1, continued movement of the apparatus along the row, in effect, causes the pendant portions to be folded over the vines and to extend to a certain extent forwardly, or in other words from right to left as viewed in FIG. 1. Thus, passage of the first and second flexible rods over the pendant portions in no way disturbs their rested positions on the trellis and grapevines but rather simply exerts downward pressure against the pendant portions to insure that they do not fall back to their original positions.

As can be seen in FIG. 1 to the right of the apparatus, placing of the pendant portions 27 in positions extending over the grapevines 22 and trellis 13 exposes the grapes 25 growing on the fruiting canes 24. Such exposure of the crop facilitates spraying with insecticides, fumigating, dusting and the like; facilitates harvesting of the grapes by exposing the grapes for either manual or mechanical harvesting; allows the grapes to be exposed to direct sunlight; and allows ventilation in the area of the crop. Other less obvious advantages include the fact that in the case of the vine drying of the grapes to form raisins, a step involves severing of the fruiting canes. By placing of the pendant portions in positions extending over the grapevines, the fruiting canes are exposed so that even inexperienced personnel can distinguish the fruiting canes from the other canes. Another advantage in the practice of the method is that in the case of precipitation, the pendant portions positioned above the other portions of the grapevines serve as, in effect, a thatched roof to minimize the amount of water reaching the crop. Still further, the exposure of the grapes after such precipitation to direct sunlight and enhanced ventilation facilitates evaporation of such moisture as does reach the crop.

In addition, where the rows of grapevines are grown along north-south axes in the practice of the method hereof, the grapes on both sides of the grapevines are exposed to equal amounts of direct sunlight during a given day, of course depending upon the nature of the sunlight available during the morning and afternoon periods of that date. This has been found to have great advantage in enhancing the quality of the grapes produced as well as in the vine drying of grapes to form raisins.

Therefore, the method and apparatus for plant culture of the present invention provide the capability for using the pendant portions of plants, and particularly grapevines, during the growing season to protect the plants and crop when desired and to expose the crop for the performance of various work operations in a manner which is highly effective in producing a superior crop with a minimum of labor.

Although the invention has been herein shown and described in what are conceived to be the most practical and preferred embodiments, it is recognized that departures may be made therefrom within the scope of the invention, which is not to be limited to the illustrative details disclosed.

Having thus described our invention, what we claim as new and desire to secure by Letters Patent is:

1. An apparatus for disposing pendant portions of plants in attitudes suited to a selected objective, the apparatus comprising a conveyor having a grasping section operable to introduce objects to the conveyor for transport therealong and a releasing section operable to release objects borne by the conveyor therefrom, said releasing section being spaced from said grasping section; and means for mounting said conveyor on a vehicle for transport along said plants with the grasping section deployed for contact with the pendant portions of the plants and the releasing section disposed above said plants to release said pendant portions for retention in attitudes rested on other portions of the plants.

2. The apparatus of claim 1 wherein said grasping and releasing sections of the conveyor are spaced from each other a distance permitting passage of portions of the plants in movement relative to the apparatus therebetween.

3. The apparatus of claim 2 wherein the mounting means is adapted to mount the conveyor on a vehicle with said releasing section of the conveyor extending laterally of the vehicle farther than the grasping section whereby the releasing section extends a substantial distance over the plants during transport therealong.

4. The apparatus of claim 1 wherein said grasping and releasing sections of the conveyor are interconnected by a return bent section bounding a passage for movement of the portions of the plants therethrough relative to the apparatus during transport along the plants.

5. The apparatus of claim 1 wherein the mounting means is adapted to mount the conveyor on said vehicle for movement by the vehicle in a predetermined direction of travel with the conveyor canted relative to the direction of travel so that the grasping section is deployed forwardly of the releasing section relative to said direction of travel.

6. The apparatus of claim 4 wherein said releasing section is mounted on the return bent section of the conveyor for adjustment thereon to select the point of release of said pendant portions of the plants.

7. An apparatus for disposing pendant portions of the vines in attitudes suited to a selected objective, the apparatus comprising a frame having predetermined first and second portions spaced from each other to define a passage therebetween; means for mounting the frame for earth traversing movement along a row of said vines with the first portion thereof disposed in proximity to the pendant portions of the vines and the second portion disposed to pass above the vines and laterally of the first portion with the row passing in relative movement through said passage; a conveyor borne by the frame having a flight movable along a path from the first portion to the second portion of the frame; and means for driving the conveyor to move said flight along the path during said earth traversing movement whereby the conveyor transports said pendant portions of the vines from the first to the second portions of the frame to place the pendant portions over the vines.

8. The apparatus of claim 7 wherein the conveyor includes a housing having a slot therein extending from the first portion to the second portion of the frame and a continuous chain, having a plurality of members secured in spaced relation thereon, borne by the frame having a run thereof constrained in the frame to move along a path with said members extending through the slot in the housing and outwardly therefrom to define said flight of the conveyor whereby said members capture the pendant portions and transport them to the second portion of the frame.

9. The apparatus of claim 8 wherein the housing has a releasing section borne by the second portion of the frame and divergent forwardly with respect to the direction of said earth traversing movement from the remainder of the housing and said run of the chain to cause said members successively to move within the releasing section upon reaching the releasing section during movement of the chain along the path to release pendant portions of the vines therefrom.

10. The apparatus of claim 9 wherein said releasing section of the housing is movable relative to the housing and substantially transversely of said direction of travel to select the position for release of the pendant portions from the members.

11. The apparatus of claim 8 wherein said members are individually angularly related to said chain to define an acute angle with the chain facing in the direction of movement of said run along the path.

12. The apparatus of claim 7 wherein said mounting means is adapted to mount the frame on a motorized vehicle for movement in a predetermined direction of travel along the row with the conveyor deployed laterally of said direction of travel substantially conforming to the row and with the conveyor rearwardly inclined with respect to said direction of travel from the first portion to the second portion of the frame and wherein the conveyor extends more than one half the width of the row and above said row.

13. The apparatus of claim 12 wherein a flexible rod is mounted on the apparatus extending rearwardly with respect to said direction of travel and transversely of the row resiliently to apply pressure downwardly on the pendant portions of the vines and against other portions of the vines during movement of the apparatus along the row.

* * * * *